March 2, 1943. H. D. GEYER 2,312,812
AUTOMOBILE BODY CONSTRUCTION
Filed Aug. 27, 1940 2 Sheets-Sheet 2

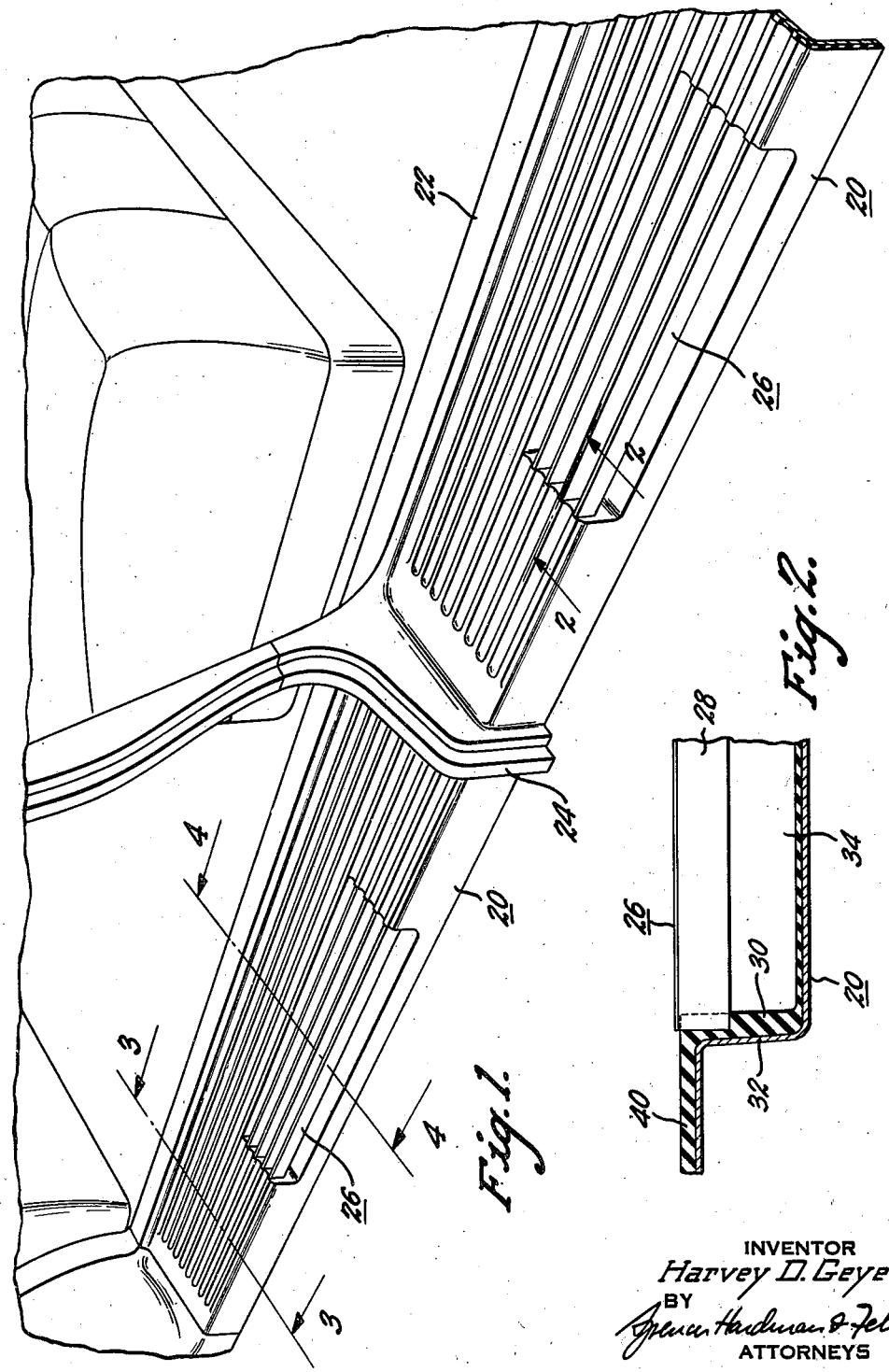

INVENTOR
Harvey D. Geyer
BY
ATTORNEYS

Patented Mar. 2, 1943

2,312,812

UNITED STATES PATENT OFFICE 2,312,812

AUTOMOBILE BODY CONSTRUCTION

Harvey D. Geyer, Dayton, Ohio, assignor to General Motors Corporation, Detroit, Mich., a corporation of Delaware Application August 27, 1940, Serial No. 354,415

4 Claims. (Cl. 296—44)

This application relates to automobile body construction.

It is an object of the invention to provide a body construction for an automobile wherein a door conceals the running board and seals therewith to prevent ingress of air into the body.

Another object of the invention is to provide foot scraping means integral with said running board which may also be concealed by the door when the door is in closed position.

In carrying out the above object it is a further object to provide scrapers comprising strips of metal resiliently held in said running board.

Another object of the invention is to provide a dual sealing means on said door whereby the door may seal with the running board at least at two places remotely spaced from one another.

Further objects and advantages of the present invention will be apparent from the following description, reference being had to the accompanying drawings wherein a preferred embodiment of the present invention is clearly shown.

In the drawings:

Fig. 1 is a fragmentary perspective view of the running board attached to an automobile body.

Fig. 2 is a sectional view taken on the line 2—2 of Fig. 1, showing a scraper strip held in its resilient mounting.

Recent trends in automobile body construction have been toward what is termed the "torpedo" construction wherein the body is streamlined and wherein the running board has been completely eliminated. The elimination of the running board while enhancing the appearance of the car has the drawback of removing all means for persons entering the car to scrape mud, etc., off their feet prior to entry into the car.

The present invention is directed to a body construction wherein the outer configuration of the body is streamlined and has the appearance of the usual type of torpedo body, but wherein the running board is replaced so that when the doors are in open position persons entering the car may step upon the running board and may scrape their feet thereon to remove mud, etc.

In my construction, I provide the doors with a flared out lower portion which completely covers the running board when the door is in closed position and I likewise provide a foot scraping means integral with the running board.

Figure 4:
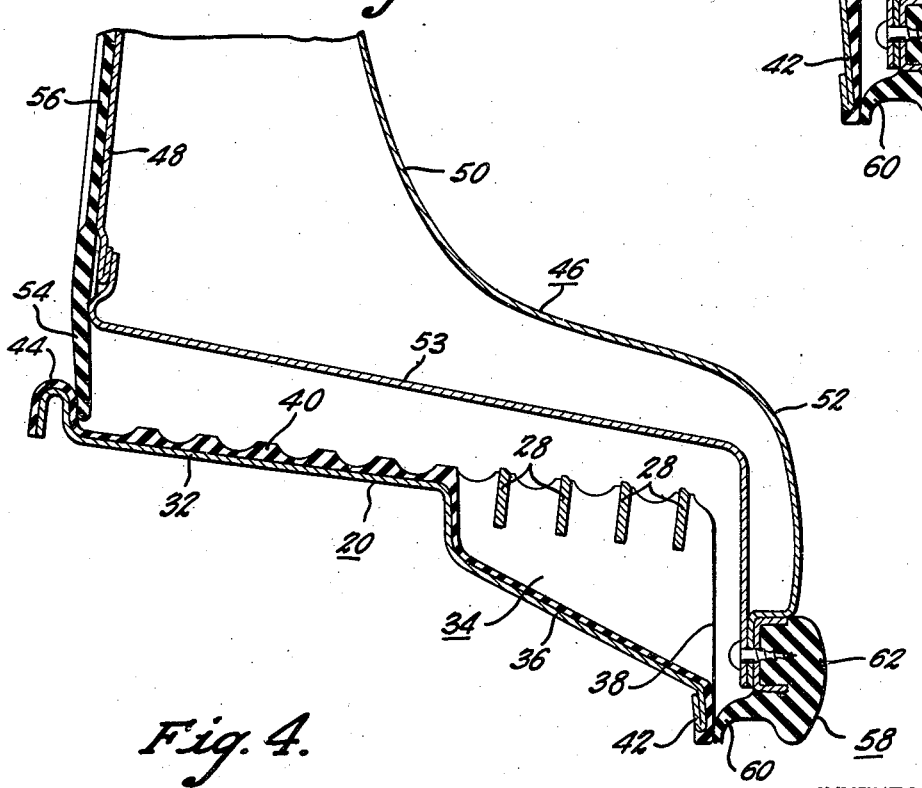
Fig. 4 is a sectional view taken on the line 4—4 of Fig. 1, wtih the door in closed position showing the construction of the foot scraper.

Referring particularly to Fig. 1, 20 illustrates a running board attached longitudinally to the lower edge of an automobile body 22, which running board is separated at its central portion by a suitable support column 24 that extends upwardly and acts as a division between the two doors, not shown. Running board 20 includes integral foot scrapers 26 therein at both its forward and rearward portions. The scraper 26 comprises a plurality of metallic strips 28 set edgewise in rubber 30 which is vulcanized to the metallic base 32 of the running board 20. The running board at this portion is depressed as at 34 to form a box beneath the strips 28, which box, referring to Fig. 4, has a sloping bottom 36 that is open adjacent the front edge of the running board 38. Thus, any mud scraped off falls into box 34 and thence along the bottom 36 and outwardly through the aperture 38 and on to the ground when the door is in open position. The rubber mounting 30 is slightly thickened in the box 34 and is preferably a continuation of the rubber covering 40 which completely covers the outer surface of the running board. The strips 28 being set in the rubber 30 and vulcanized thereto are resiliently mounted and, therefore, when a shoe is scraped thereover the strips yieldingly partially rotate about their longitudinal axis. In this manner the efficiency of the scraper is increased.

Figure 3:
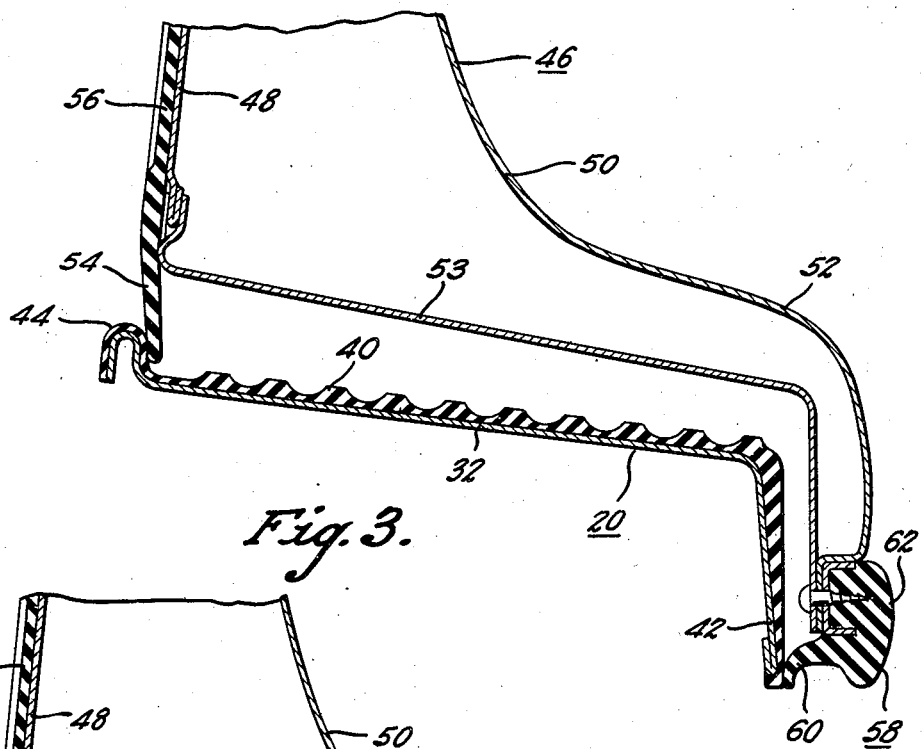
Fig. 3 is a sectional view taken on line 3—3 of Fig. 1 with the door in closed position showing the action of the sealing strip.

Referring to Fig. 3, the running board 20 has a downwardly extending longitudinal flange 42 thereon at the outer edge and an upwardly extending longitudinal bead 44 at the inner edge thereof. A door 46 is provided which includes an interior panel 48 and an exterior panel 50 which is flared outwardly at 52 so as to conceal the running board when the door is in closed position. The inner door panel is extended at 53 by means of a reinforcing angle which runs the entire length of the door and is held to the outer panel 50, thereby spacing the panels 48 and 50 from one another in a rigid manner.

The inner panel 48 includes a sealing strip 54 which extends downwardly from the inner surface of the panel and resiliently engages the bead 44 when the door is in closed position thereby sealing along its engaging portion. The strip 54 is of sufficient length to be flexed toward the outer edge of the running board when the door is closed although the strip 54 normally comprises an extension of the inside surface of the door. Thus, when the strip 54 seals against bead 44 by means of the resilient flexing action thereof an adequate air seal is accomplished.

In some cases the strip 54 may be a portion of a scuff strip that is, the strip 54 may extend upwardly as at 56 a substantial distance to cover the lower portion of the upholstery of the door whereby the upholstery is not disfigured by person's feet or by moisture, etc., absorbed from the floor mat in wet weather. The scuff strip 56 being of rubber is easily cleaned and if disfigured, may be replaced without difficulty, thereby completely protecting the lower portion of the upholstery on the door.

At the outer side of the door on panel 52, a bumper strip 58 is provided which includes a resilient flange 60 thereon. The flange 60 normally extends in a generally downwardly direction although when the door is in closed position, flange 60 is flexed against the lower edge of flange 42 to seal therewith. In other words, the length of the resilient flange 60 is greater than the normal distance between the inside door panel 52 to the outer side of the flange 42 thereby necessitating flexure of the flange 60 when the door is closed to completely seal against the lower edge of the running board. As noted in Fig. 4, the flange 60 seals below the opening 38 in the scraper thereby preventing drafts from entering this opening.

The outer portion of the strip 58 as noted at 62 comprises a bumper which extends slightly beyond the outer surface of the door panel 52 whereby the lower edge of the panel is not disfigured when it scrapes against a curb or the like upon opening the door and likewise if the door is thrown open against a post or tree, etc., the bumper 62 prevents disfigurement thereof. Thus the bumper strip 58 acts as a bumper on the outer surface thereof and as a sealing means at the inner side thereof.

It will be apparent from the foregoing description that the door 46 is sealed in two places against ingress of air in the bottom, namely, by means of flexing flange 60 against the outer edge of the running board and by means of the flexing strip 54 against the bead 44 at the inner edge of the running board. Obviously, similar expedients are provided for each door of the car.

I have also provided an efficient inexpensive foot scraper which is substantially integral with the running board and has an opening 38 therein preventing clogging thereof since any mud, etc., that is scraped thereon immediately falls out upon the road surface beneath the running board.

The body construction described herein provides a streamlined appearance to the automobile without the heretofore necessary removal of the running board. Likewise due to the dual sealing strip construction, I provide a door which adequately seals against the outside atmosphere thereby preventing extraneous drafts from entering the body of the automobile.

While the embodiments of the present invention as herein disclosed, constitute a preferred form, it is to be understood that other forms might be adopted, all coming within the scope of the claims which follow.

What is claimed is as follows:

1. In combination with an automobile body, a swinging door therefor, a running board, a foot scraper formed in said running board and comprising a depression therein having an angularly shaped bottom thereto and an outlet adjacent the outer edge of said running board, said scraper including a plurality of parallelly spaced metallic scraper strips which are resiliently mounted in the rubber of the running board, and a pair of sealing strips attached to said door, one of said strips being adapted to seal the door to the inner edge of the running board and the other of said strips adapted to seal the door to the outer edge of the running board and below said outlet of said scraper whereby ingress of air is prevented through said scraper depression when the door is in closed position.

2. In combination with an automobile body, a running board therefor comprising a longitudinally extending member having a depression therein which opens at the side of said running board and which includes a downwardly sloping lower wall therein, a plurality of parallelly spaced metallic strips set edgewise in said running board across said depression and held in place by means of a resilient mounting which is vulcanized to said member whereby the strips are resiliently held and are capable of limited rotational movement about their longitudinal axis when they are used as a foot scraper.

3. A body construction for a vehicle comprising, a body, a door attached to the body and adapted to close an opening therein, a running board attached to the body, said door when closed concealing said running board completely, and a plurality of spaced sealing strips carried by said door and adapted to engage portions of said running board which are spaced from one another when the door is in closed position whereby the interior of the body is sealed by means of said strips, one of said strips being a combined bumper and sealing strip extending along the outer bottom edge of the door and having the bumper portion bulging outwardly from the outer surface of the door near its outer bottom edge, and the sealing portion thereof projecting inwardly from said bottom edge, said bottom edge of the door being spaced from a vertical wall of the running board when the door is in closed position, said space being sealed by said sealing portion of said combined bumper and sealing strip.

4. In combination with an automobile body, a swinging door therefor, a running board adapted to be concealed by said door when the door is in closed position, a foot scraper formed in said running board and including an opening on the upper surface of the running board and also an outlet on the vertical surface of the running board so that material dropping in said openings will fall therefrom through said outlet in the vertical wall of the running board, and spaced sealing strips carried by the door and adapted to seal with the running board when the door is in closed position, said sealing strips including an inner sealing strip which seals the running board from the body and an outer sealing strip which seals against the running board at the outer portion thereof below said outlet when the door is in closed position.

HARVEY D. GEYER.